(12) United States Patent
Ding

(10) Patent No.: US 12,728,947 B2
(45) Date of Patent: Sep. 8, 2026

(54) ELECTRIC FOLDING VEHICLE

(71) Applicant: DONGGUAN YUZHEXIN HARDWARE PLASTIC PRODUCTS CO., LTD, Dongguan (CN)

(72) Inventor: Sheng Ding, Dongguan (CN)

(73) Assignee: DONGGUAN YUZHEXIN HARDWARE PLASTIC PRODUCTS CO., LTD, Dongguan (CN)

( * ) Notice: Subject to any disclaimer, the term of this patent is extended or adjusted under 35 U.S.C. 154(b) by 333 days.

(21) Appl. No.: 18/524,161

(22) Filed: Nov. 30, 2023

(65) Prior Publication Data

US 2025/0026429 A1 Jan. 23, 2025

(30) Foreign Application Priority Data

Jul. 20, 2023 (CN) ........................ 202321928082.7

(51) Int. Cl.
*B62K 15/00* (2006.01)
*B62K 5/007* (2013.01)

(52) U.S. Cl.
CPC ............ *B62K 15/008* (2013.01); *B62K 5/007* (2013.01)

(58) Field of Classification Search
CPC ... B62K 15/008; B62K 5/007; B62K 2201/04
See application file for complete search history.

(56) References Cited

U.S. PATENT DOCUMENTS

| | | | | |
|---|---|---|---|---|
| 6,338,393 | B1 * | 1/2002 | Martin | B62K 3/002 180/227 |
| 6,375,208 | B1 * | 4/2002 | Lee | A63B 21/4035 280/282 |
| 10,647,377 | B2 * | 5/2020 | Zhang | B62K 15/008 |
| 10,717,491 | B1 * | 7/2020 | Neville | B62K 15/008 |
| 10,729,603 | B2 * | 8/2020 | Wang | B62K 5/003 |
| 2019/0283831 | A1 * | 9/2019 | Zhang | B62K 3/16 |
| 2020/0216117 | A1 * | 7/2020 | Chiu | B62K 15/008 |
| 2021/0053647 | A1 * | 2/2021 | Wang | B62K 5/007 |
| 2024/0190530 | A1 * | 6/2024 | Kim | B62K 19/30 |
| 2025/0187696 | A1 * | 6/2025 | Zhu | B62K 15/006 |

* cited by examiner

*Primary Examiner* — Alentin Neacsu
*Assistant Examiner* — Marlon A Arce
(74) *Attorney, Agent, or Firm* — JEEN IP LAW, LLC

(57) ABSTRACT

The present invention discloses an electric folding vehicle, including a front wheel frame, a first vehicle frame, a second vehicle frame, a chair frame, and a linkage mechanism. The linkage mechanism includes a first linkage rod with a first end rotatably connected to the front wheel frame and a second end rotatably connected to the second vehicle frame, and a second linkage rod with a first end rotatably connected to the second end of the first linkage rod and a second end connected to the chair frame. By providing a linkage mechanism, when the first vehicle frame and the second vehicle frame are folded and collapsed, the present invention can drive the front wheel frame to fold synchronously with the chair frame, so as to achieve rapid folding and collapsing of the electric folding vehicle, and make the electric folding vehicle more convenient to carry.

9 Claims, 5 Drawing Sheets

ELECTRIC FOLDING VEHICLE

CROSS-REFERENCE TO RELATED APPLICATIONS

This application claims priority to Chinese Patent Application No. 202321928082.7, filed on Jul. 20, 2023, which is hereby incorporated by reference in its entirety.

TECHNICAL FIELD

The embodiments of the present invention relate to the technical field of folding vehicles, in particular to an electric folding vehicle.

BACKGROUND

With the advent of folding vehicles, people enjoy the advantages of folding vehicles of being easy to carry and occupying a small amount of space. However, the existing folding vehicles are too complicated to fold or unfold. As folding requires a large amount of time and effort, it greatly affects the user's experience.

SUMMARY

The present invention provides an electric folding vehicle in order to solve the technical problems raised in the above-mentioned background art.

The present invention provides an electric folding vehicle, including a front wheel frame, a first vehicle frame with one end rotatably connected to the front wheel frame, a second vehicle frame rotatably connected to the other end of the first vehicle frame, a chair frame arranged on the second vehicle frame, and a linkage mechanism for driving the chair frame and the front wheel frame to simultaneously fold and collapse with the folding of the first vehicle frame and the second vehicle frame. The linkage mechanism includes a first linkage rod with a first end rotatably connected to the front wheel frame and a second end rotatably connected to the second vehicle frame, and a second linkage rod with a first end rotatably connected to the second end of the first linkage rod and a second end connected to the chair frame.

Further, the chair frame comprises a transmission piece, and a first crossbar and a second crossbar which are rotatably cross-connected, wherein a lower end of the second crossbar is rotatably connected to a first end of the second vehicle frame, an upper end of the second crossbar is connected to a second end of the seat, a lower end of the first crossbar is rotatably connected to an upper end of the transmission piece, a lower end of the transmission piece is rotatably connected to a second end of the second vehicle frame, and a second end of the second linkage rod is rotatably connected to the transmission piece.

Further, the chair frame further comprises a shock-absorbing member provided between the second end of the seat and the second crossbar; and an upper end of the shock-absorbing member is rotatably connected to the second end of the seat, and a lower end of the shock-absorbing member is rotatably connected to the second crossbar.

Further, the chair frame further comprises a backrest rod and a backrest adapter rod; a lower end of the backrest rod is rotatably connected to the second end of the seat, an upper end of the backrest rod is rotatably connected to an upper end of the backrest adapter rod, and a lower end of the backrest adapter rod is rotatably connected to the upper end of the second crossbar; and the backrest rod is provided with a backrest cushion.

Further, the chair frame further comprises a guard frame and a guard frame adapter rod; and a lower end of the guard frame adapter rod is rotatably connected to the seat, an upper end of the guard frame adapter rod is rotatably connected to the guard frame, and a second end of the guard frame is rotatably connected to the backrest rod.

Further, a telescopic steering rod is connected to the front wheel frame, and the steering rod comprises a sleeve connected to the front wheel frame, a telescopic tube telescopically inserted in the sleeve, and a handle connected to the telescopic tube.

Further, a locking mechanism is provided between the telescopic tube and the sleeve, and the locking mechanism comprises a plurality of locking holes provided on the sleeve, an elastic member fixedly provided on the telescopic tube, and a clamping piece provided on the elastic member.

Further, a stopping and abutting plate is provided on the first linkage rod; and when the first linkage rod and the second linkage rod are folded in half, the second linkage rod abuts against the stopping and abutting plate.

Further, the end of the second end of the first vehicle frame is inclined toward the ground; and the upper end of the second crossbar extends obliquely in a direction away from the front wheel frame.

Further, the shock-absorbing member comprises a cover piece rotatably connected to the second crossbar, an insert with one end telescopically inserted in the cover piece and the other end rotatably connected to the seat, and a spring provided between the cover piece and the insert.

With the above-mentioned technical solution, the invention has at least the following beneficial effects: according to the present invention, the first end of the first linkage rod is rotatably connected to the front wheel frame, and its second end is rotatably connected to the second vehicle frame, and the first end of the second linkage rod is rotatably connected to the first linkage rod, and its second end is connected to the chair frame, so that the first vehicle frame and the second vehicle frame can simultaneously drive the second linkage rod to rotate while folding in half and collapsing or opening, and the second linkage rod synchronously drives the chair frame to collapsing and folding or open; and under the action of the first linkage rod, the front wheel frame can rotate relative to the first vehicle frame, so that the front wheel frame is closer to the first vehicle frame, and then the present invention can be quickly and conveniently collapsed or opened, making it convenient to carry and use.

DESCRIPTION OF EMBODIMENTS

The following provides a further detailed explanation of the invention through specific implementation modes combined with the accompanying drawings. It should be understood that the embodiments described below with reference to the accompanying drawings are exemplary and are intended to explain the present invention and are not to be construed as limiting the present invention, and that the features of the embodiments in the present invention can be combined with each other without conflict.

Figure 1:
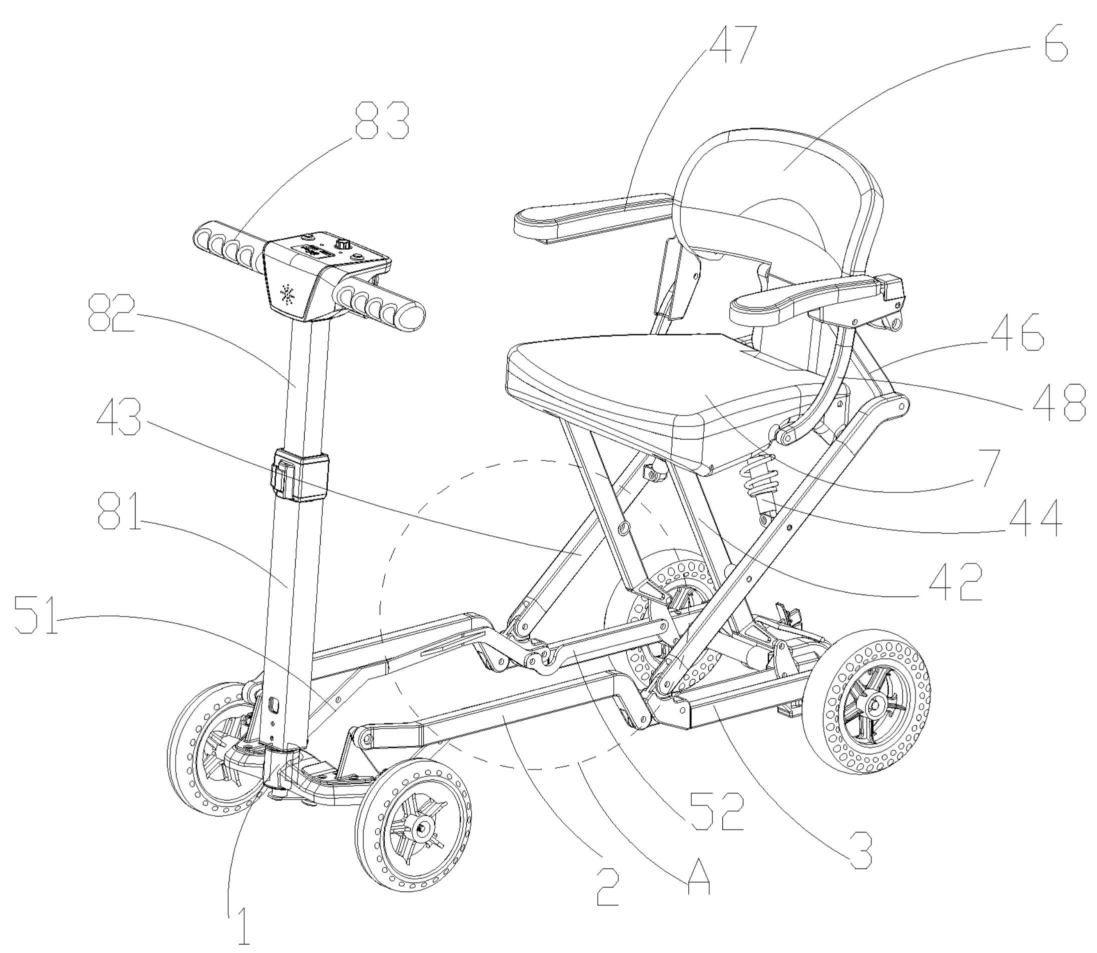
FIG. 1 is a perspective view of an electric folding vehicle of the present invention.
Figure 2:
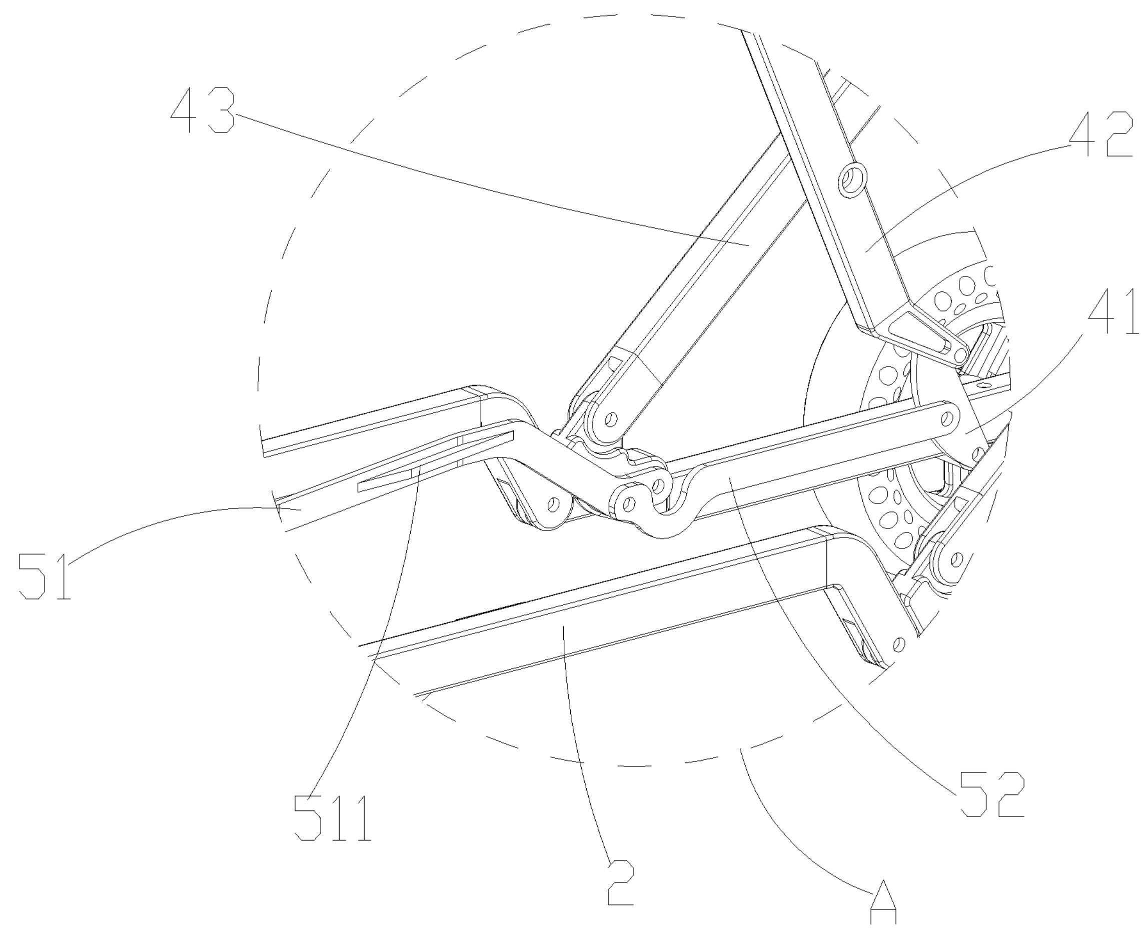
FIG. 2 is an enlarged view of Part A in FIG. 1.
Figure 3:
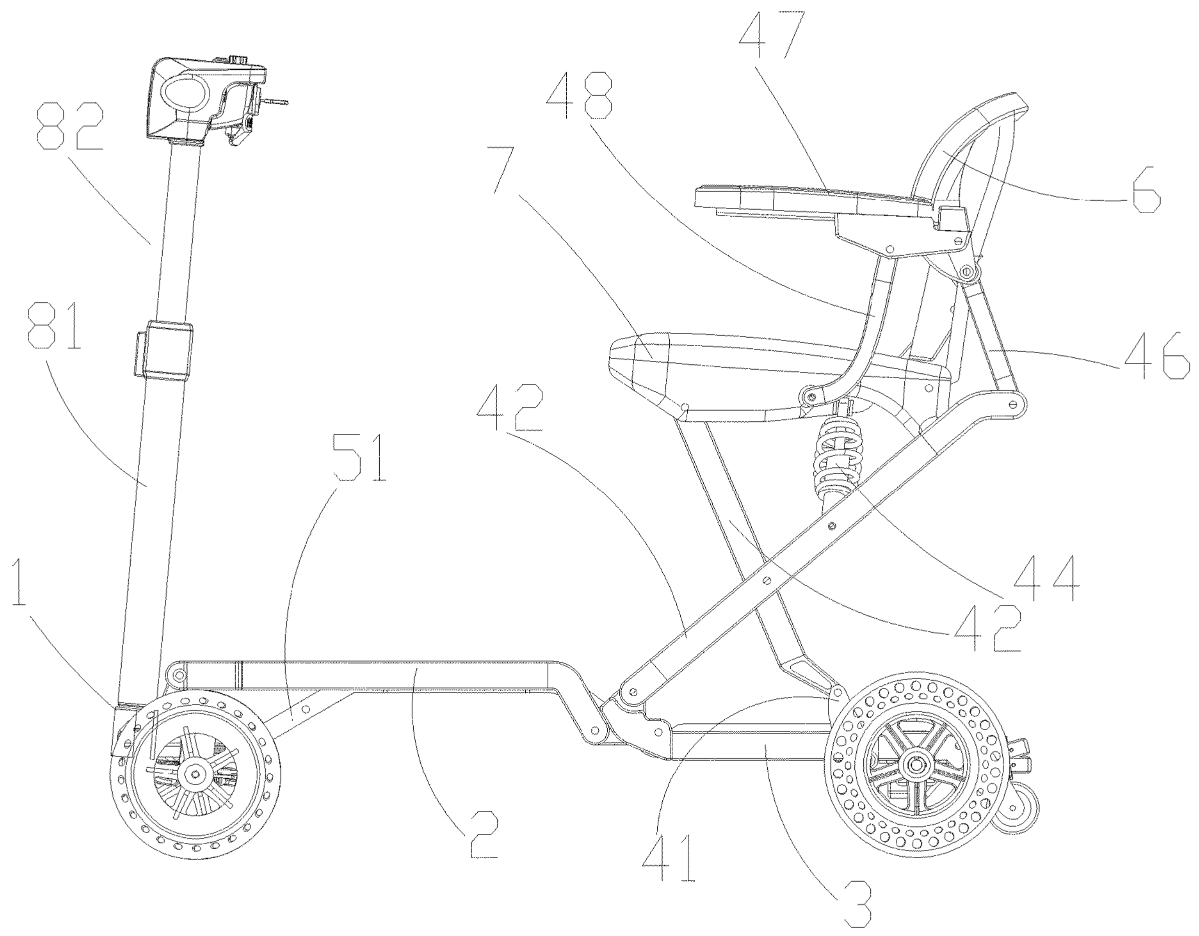
FIG. 3 is a side view of an electric folding vehicle of the present invention.
Figure 4:
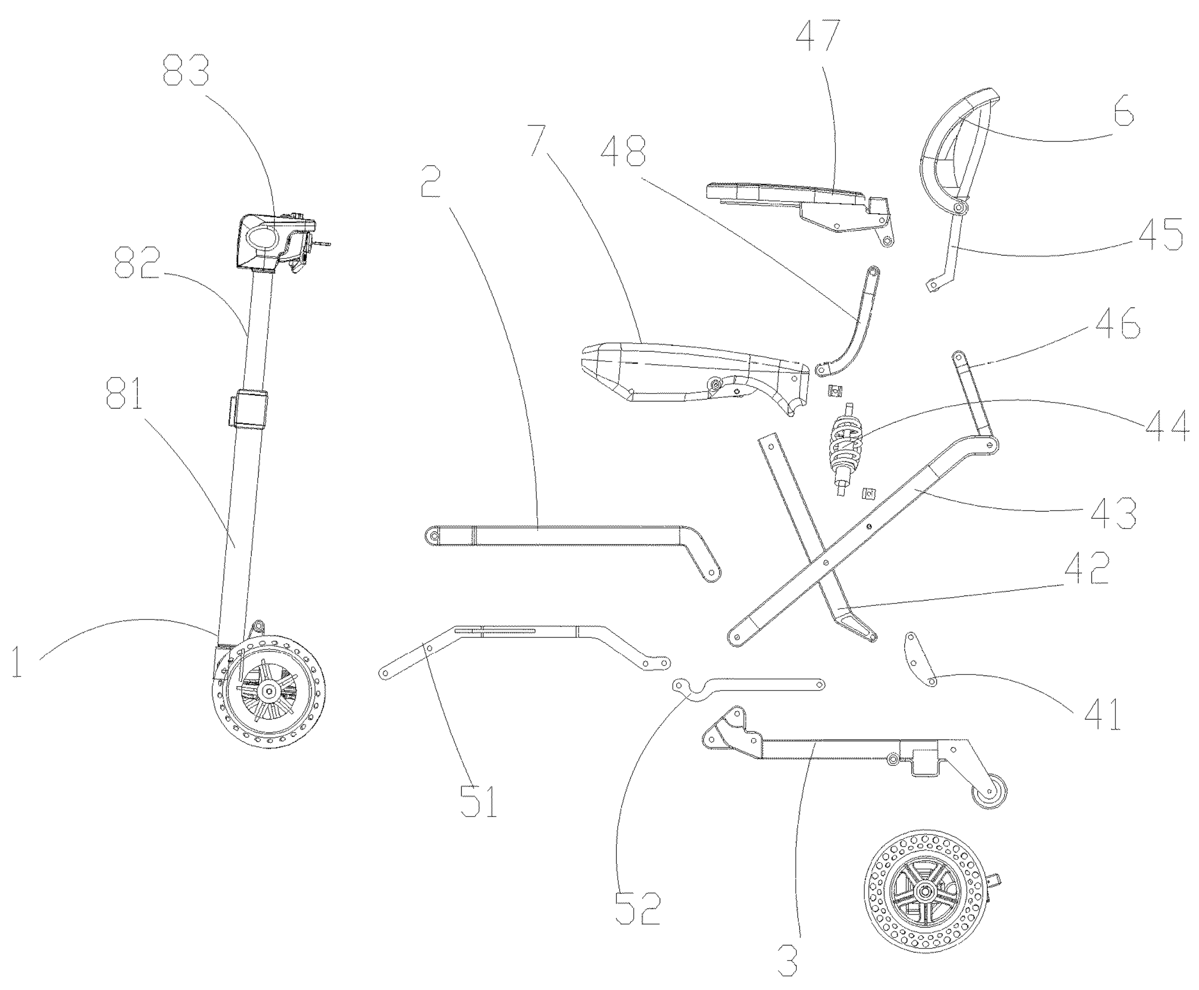
FIG. 4 is an exploded view of an electric folding vehicle of the present invention.
Figure 5:
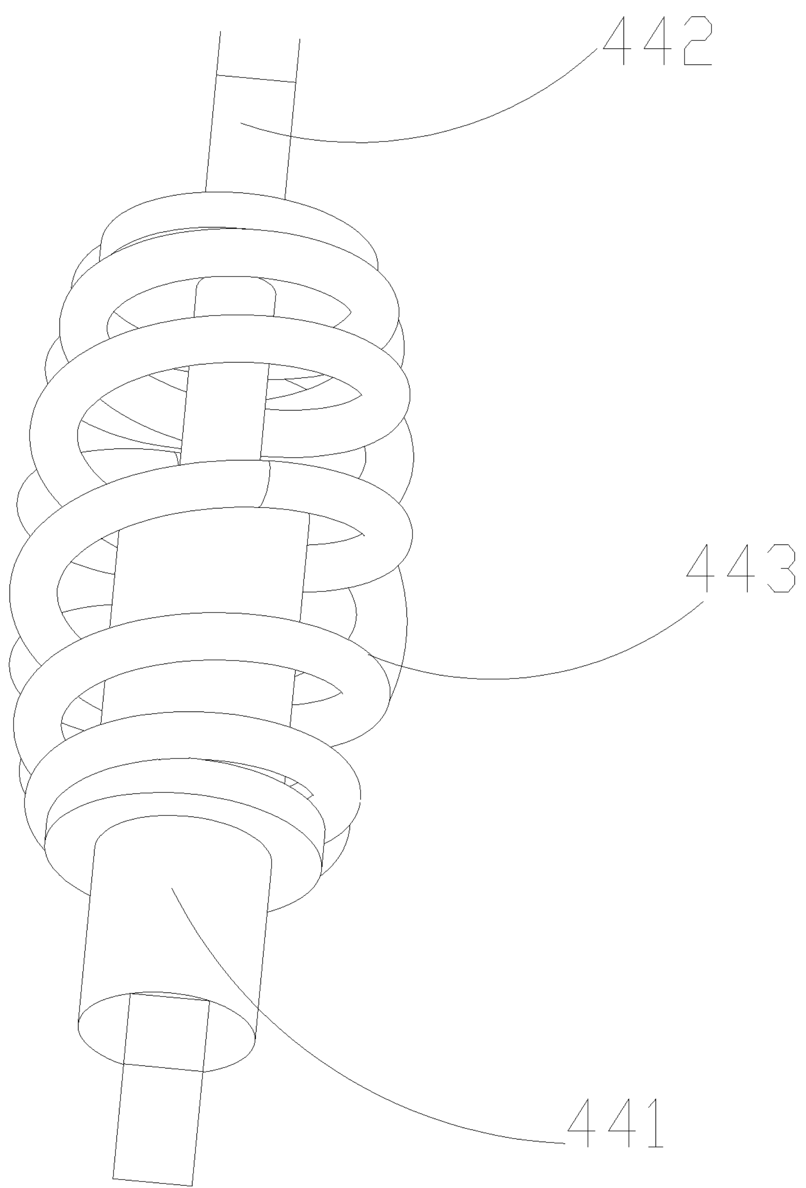
FIG. 5 is a perspective view of a shock-absorbing member of an electric folding vehicle of the present invention.

As shown in FIGS. 1-5, the present invention provides an electric folding vehicle, comprising a front wheel frame 1, a first vehicle frame 2 with one end rotatably connected to the front wheel frame 1, a second vehicle frame 3 rotatably connected to the other end of the first vehicle frame 2, a chair frame arranged on the second vehicle frame 3, and a linkage mechanism for driving the chair frame and the front wheel frame 1 to fold and collapse synchronously with the folding of the first vehicle frame 2 and the second vehicle frame 3. The linkage mechanism comprises a first linkage rod 51 with a first end rotatably connected to the front wheel frame 1 and a second end rotatably connected to the second vehicle frame 3, and a second linkage rod 52 with a first end rotatably connected to a second end of the first linkage rod 51 and a second end connected to the chair frame.

In the present embodiment, the first end of the first linkage rod 51 is rotatably connected to the front wheel frame 1, and its second end is rotatably connected to the second vehicle frame 3, and the first end of the second linkage rod 52 is rotatably connected to the first linkage rod 51, and its second end is connected to the chair frame, so that the first vehicle frame 2 and the second vehicle frame 3 can simultaneously drive the second linkage rod 52 to rotate while folding in half and collapsing or opening, and the second linkage rod 52 synchronously drives the chair frame to collapsing and folding or open; and under the action of the first linkage rod 51, the front wheel frame 1 can rotate relative to the first vehicle frame 2, so that the front wheel frame 1 is closer to the first vehicle frame 2, and then the present invention can be quickly and conveniently collapsed or opened, making it convenient to carry and use.

In a particular embodiment, the chair frame comprises a transmission piece 41, and a first crossbar 42 and a second crossbar 43 which are rotatably cross-connected. A lower end of the second crossbar 43 is rotatably connected to a first end of the second vehicle frame 3, an upper end of the second crossbar 43 is connected to a second end of a seat 7, a lower end of the first crossbar 42 is rotatably connected to an upper end of the transmission piece 41, a lower end of the transmission piece 41 is rotatably connected to a second end of the second vehicle frame 3, and a second end of the second linkage rod 52 is rotatably connected to the transmission piece 41. In this embodiment, the first crossbar 42 and the second crossbar 43 are rotatably cross-connected, so that when folding, the first crossbars 42 can be close to each other, thereby reducing the occupation of space, and when unfolding, the seat 7 can be well supported, improving the structural stability; the lower end and the upper end of the second crossbar 43 are respectively rotatably connected to the first end of the second vehicle frame 3 and the second end of the seat 7, so that when the first vehicle frame 2 and the second vehicle frame 3 are folded in half, the second vehicle frame 3 can drive the second crossbar 43 and the seat 7 to fold and collapse in the direction of the second vehicle frame 3; and the lower end of the first crossbar 42 is rotatably connected to the upper end of the transmission frame, the lower end of the transmission piece 41 is rotatably connected to the second end of the second vehicle frame 3, and the second end of the second linkage rod 52 is rotatably connected to the transmission piece 41, so that when the first vehicle frame 2 and the second vehicle frame 3 are folded in half, the first crossbar 42 and the transmission piece 41 can fold and collapse together in the direction of the second vehicle frame 3 after cooperating. Therefore, the folding of the electric folding vehicle is quickly achieved.

In one particular embodiment, the chair frame further comprises a shock-absorbing member 44 arranged between the second end of the seat 7 and the second crossbar 43; an upper end of the shock-absorbing member 44 is rotatably connected to a second end of the seat 7, a lower end of the shock-absorbing member 44 is rotatably connected to the second crossbar 43, and the upper end and the lower end of the shock-absorbing member 44 are rotatably connected to the seat 7 and the second crossbar 43 respectively, so that the seat 7 can be folded in the direction of the second crossbar 43; and when the electric folding vehicle is in an unfolded state, the shock-absorbing function can be provided for the seat 7 while the seat 7 being supported, thereby improving user comfortableness.

In one particular embodiment, the chair frame further comprises a backrest rod 45 and a backrest adapter rod 46; the lower end of the backrest rod 45 is rotatably connected to the second end of the seat 7, the upper end of the backrest rod 45 is rotatably connected to the upper end of the backrest adapter rod 46, and the lower end of the backrest adapter rod 46 is rotatably connected to the upper end of the second crossbar 43, thereby enabling the backrest rod 45 to be folded in the direction of the second crossbar 43 via the backrest adapter rod 46, so as to reduce the occupation of space after the electric folding vehicle is folded; and the backrest rod 45 is provided with a backrest cushion 6, so as to improve the user's comfortableness.

In one particular embodiment, the chair frame further comprises a guard frame 47 and a guard frame adapter rod 48; a lower end of the guard frame adapter rod 48 is rotatably connected to the seat 7, an upper end of the guard frame adapter rod 48 is rotatably connected to the guard frame 47, and a second end of the guard frame 47 is rotatably connected to the backrest rod 45, so that when the electric folding vehicle is folded, the guard frame 47 can be folded in the direction of the seat 7, thereby reducing the space occupied by the folded electric folding vehicle; and providing the guard frame 47 can improve user's using safety.

In one particular embodiment, a telescopic steering rod is connected to the front wheel frame 1, and the steering rod comprises a sleeve 81 connected to the front wheel frame 1, a telescopic tube 82 telescopically inserted in the sleeve 81, and a handle 83 connected to the telescopic tube 82; a locking mechanism is provided between the telescopic tube 82 and the sleeve 81, and the locking mechanism comprises a plurality of locking holes provided on the sleeve 81, an elastic member fixedly provided on the telescopic tube 82, and a clamping piece provided on the elastic member. In this embodiment, when the height of the steering rod needs to be changed, only the clamping piece needs to be pressed into the sleeve 81 to contact the locking of the telescopic tube 82. At this moment, the telescopic tube 82 is pulled or pushed to move toward the sleeve 81 or away from the sleeve 81. When the clamping piece reaches another one of the locking holes, the clamping piece protrudes from the locking hole under the elastic force of the elastic member, thereby locking the telescopic tube 82 in the sleeve 81 so as to adjust the height of the steering rod.

In one particular embodiment, a stopping and abutting plate 511 is provided on the first linkage rod 51; when the first linkage rod 51 and the second linkage rod 52 are folded in half, the second linkage rod 52 abuts against the stopping and abutting plate 511, and the first linkage rod 51 and the second linkage rod 52 can be prevented from being folded in half too much by means of the stopping and abutting action of the stopping and abutting plate 511, so that the connection between the two is stable; furthermore, a stopping and abutting groove can be provided on the stopping and abutting plate 511, and a stopping and abutting protrusion cooperating with the stopping and abutting groove can be provided on the second linkage rod 52 such that by means of the cooperation of the stopping and abutting groove and the stopping and abutting protrusion, it is possible to limit the folding of the first linkage rod 51 and the second linkage rod 52; and in the absence of an external force, the first linkage rod 51 and the second linkage rod 52 can be firmly connected together to play a role of stably folding in half.

In one particular embodiment, the end of the second end of the first vehicle frame 2 is inclined towards the ground; thus, the folded inclined position can accommodate the end of the second vehicle frame 3 to reduce the occupation of space. The upper end of the second crossbar 43 extends obliquely in a direction away from the front wheel frame 1, so that the inclined position of the upper end of the second crossbar 43 can avoid the rear wheel of the electric folding vehicle, thereby reducing the occupation of space.

In one particular embodiment, the shock-absorbing member 44 comprises a cover piece 441 rotatably connected to the second crossbar 43, an insert 442 with one end being telescopically inserted in the cover piece 441 and the other end being rotatably connected to the seat 7, and a spring arranged between the cover piece 441 and the insert 442. The spring is arranged between the insert 442 and the cover piece 441, so that when a user uses the invention and encounters vibration, the spring can play a buffering role and improve the user's comfortableness.

While embodiments of the present invention have been displayed and described, it will be understood by those skilled in the art that various changes, modifications, substitutions, and alterations may be made to these examples without departing from the principles and spirit of the present invention, and the scope of the present invention is limited by the attached claims and equivalent scope thereof.

The invention claimed is:

1. An electric folding vehicle, characterized by comprising a front wheel frame, a first vehicle frame with one end rotatably connected to the front wheel frame, a second vehicle frame rotatably connected to the other end of the first vehicle frame, a chair frame arranged on the second vehicle frame, and a linkage mechanism for driving the chair frame and the front wheel frame to synchronously fold and collapse with foldings of the first vehicle frame and the second vehicle frame, wherein the linkage mechanism comprises a first linkage rod with a first end rotatably connected to the front wheel frame and a second end rotatably connected to the second vehicle frame, and a second linkage rod with a first end rotatably connected to the second end of the first linkage rod and a second end connected to the chair frame;

wherein the chair frame comprises a transmission piece, and a first crossbar and a second crossbar which are rotatably cross-connected;

wherein the chair frame further comprises a shock-absorbing member provided between a second end of a seat and the second crossbar; and an upper end of the shock-absorbing member is rotatably connected to the second end of the seat, and a lower end of the shock-absorbing member is rotatably connected to the second crossbar.

2. The electric folding vehicle according to claim 1, wherein a lower end of the second crossbar is rotatably connected to a first end of the second vehicle frame, an upper end of the second crossbar is connected to the second end of the seat, a lower end of the first crossbar is rotatably connected to an upper end of the transmission piece, a lower end of the transmission piece is rotatably connected to a second end of the second vehicle frame, and a second end of the second linkage rod is rotatably connected to the transmission piece.

3. The electric folding vehicle according to claim 2, characterized in that the chair frame further comprises a backrest rod and a backrest adapter rod; a lower end of the backrest rod is rotatably connected to the second end of the seat, an upper end of the backrest rod is rotatably connected to an upper end of the backrest adapter rod, and a lower end of the backrest adapter rod is rotatably connected to the upper end of the second crossbar; and the backrest rod is provided with a backrest cushion.

4. The electric folding vehicle according to claim 3, characterized in that the chair frame further comprises a guard frame and a guard frame adapter rod; and a lower end of the guard frame adapter rod is rotatably connected to the seat, an upper end of the guard frame adapter rod is rotatably connected to the guard frame, and a second end of the guard frame is rotatably connected to the backrest rod.

5. The electric folding vehicle according to claim 1, characterized in that a telescopic steering rod is connected to the front wheel frame, and the steering rod comprises a sleeve connected to the front wheel frame, a telescopic tube telescopically inserted in the sleeve, and a handle connected to the telescopic tube.

6. The electric folding vehicle according to claim 5, characterized in that a locking mechanism is provided between the telescopic tube and the sleeve, and the locking mechanism comprises a plurality of locking holes provided on the sleeve, an elastic member fixedly provided on the telescopic tube, and a clamping piece provided on the elastic member.

7. The electric folding vehicle according to claim 1, characterized in that a stopping and abutting plate is provided on the first linkage rod; and when the first linkage rod and the second linkage rod are folded in half, the second linkage rod abuts against the stopping and abutting plate.

8. The electric folding vehicle according to claim 2, characterized in that an end of the second end of the first vehicle frame is inclined toward the ground; and the upper end of the second crossbar extends obliquely in a direction away from the front wheel frame.

9. The electric folding vehicle according to claim 1, characterized in that the shock-absorbing member comprises a cover piece rotatably connected to the second crossbar, an insert with one end telescopically inserted in the cover piece and the other end rotatably connected to the seat, and a spring provided between the cover piece and the insert.

* * * * *